(12) United States Patent
Kaufmann

(10) Patent No.: US 7,405,016 B2
(45) Date of Patent: Jul. 29, 2008

(54) APPARATUS FOR SUPPLYING AN OXYGEN-CONTAINING GAS TO A FUEL CELL SYSTEM

(75) Inventor: Lars Kaufmann, Alfter (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 604 days.

(21) Appl. No.: 10/487,532

(22) PCT Filed: Aug. 28, 2002

(86) PCT No.: PCT/EP02/09599

§ 371 (c)(1),
(2), (4) Date: Sep. 14, 2004

(87) PCT Pub. No.: WO03/021701

PCT Pub. Date: Mar. 13, 2003

(65) Prior Publication Data

US 2005/0014052 A1    Jan. 20, 2005

(30) Foreign Application Priority Data

Aug. 28, 2001    (DE) .................................. 101 41 903

(51) Int. Cl.
*H01M 8/04* (2006.01)
(52) U.S. Cl. ............................. 429/34; 429/19; 429/25; 429/26

(58) Field of Classification Search ................... 429/19, 429/26, 34, 38, 39, 25
See application file for complete search history.

(56) References Cited

U.S. PATENT DOCUMENTS

| 4,910,099 | A | * | 3/1990 | Gottesfeld ................... 429/13 |
| 5,645,950 | A | | 7/1997 | Benz et al. .................... 429/13 |
| 5,709,961 | A | * | 1/1998 | Cisar et al. ................. 429/39 X |
| 5,794,732 | A | | 8/1998 | Lorenz et al. ............... 180/65.3 |
| 6,120,923 | A | | 9/2000 | Van Dine et al. .............. 429/17 |
| 6,416,891 | B1 | * | 7/2002 | Condit et al. .............. 429/26 X |

FOREIGN PATENT DOCUMENTS

| DE | 42 01 795 A1 | 7/1993 |
| DE | 197 55 116 C1 | 4/1999 |
| DE | 198 22 689 A1 | 11/1999 |
| JP | 2000-331698 | 11/2000 |
| JP | 2001/189162 | 7/2001 |

* cited by examiner

*Primary Examiner*—Stephen J. Kalafut
(74) *Attorney, Agent, or Firm*—Crowell & Moring LLP

(57) ABSTRACT

A fuel cell system (1) comprises at least one fuel cell (2) and at least one gas generation system (6) in which at least one component requires air during operation. A compression device (11) is provided to supply the oxygen-containing gas, for example air, to the cathode chamber (4) of the fuel cell. At least one branch line (13) also supplies oxygen-containing gas to the gas generation system component(s) that requires air during operation thereof. Exhaust gases from the fuel cell cathode chamber anode chamber are combined downstream of the fuel cell.

16 Claims, 2 Drawing Sheets

APPARATUS FOR SUPPLYING AN OXYGEN-CONTAINING GAS TO A FUEL CELL SYSTEM

CROSS-REFERENCE TO RELATED APPLICATION

This application claims priority under 35 U.S.C. §119 to German Application No. 10141903.1, filed Aug. 28, 2001, which priority application is incorporated herein by reference in its entirety.

BACKGROUND OF THE INVENTION

1. Field of the Invention

The invention concerns apparatus for supplying an oxygen containing gas to a fuel cell system, and fuel cell systems comprising such apparatus.

2. Description of the Related Art

Fuel cell systems with a gas generation system and at least one fuel cell, which for example can be a solid polymer (PEM) fuel cell, are known in the art. The gas generation system produces a hydrogen containing gas for the fuel cell from a is process stream, which contains carbon and hydrogen. Suitable process streams are hydrocarbons; such as for example natural gas or similar substances, or hydrocarbon derivatives such as alcohols, or higher hydrocarbons, such as benzene or similar substances. Liquid hydrocarbon derivatives such as methanol or ethanol, in particular are contemplated for use in motor vehicles, due to their high energy density and ease of transport.

The supply of the fuel cell system with an oxygen containing gas, typically air, is normally implemented by means of a compression device, e.g. a compressor, which supplies air to the cathode side of the fuel cell. Should the gas generation system also require an oxygen containing gas such as air, then this is typically supplied by means of a separate compressor in the gas generation system. The second compressor obtains its air either from the surroundings or draws in pre-compressed air from the air feed to the cathode side of the fuel cell. In general, the gas generation system requires air at least for selective oxidation devices, which oxidize residual carbon monoxide in the hydrogen containing gas to carbon dioxide, since carbon monoxide can damage the fuel cell catalyst material.

A system of this type is known from DE 197 55 116 C1, wherein the exhaust gases from the cathode chamber of the fuel cell (air and $H_2O$) and from the anode area of the fuel cell ($H_2$ and $CO_2$) are fed to a catalytic burner.

The above mentioned design of apparatus to supply air to a fuel cell system has the disadvantage that it requires at least two compression devices. Each of the compression devices entails additional costs, weight, and volume, and creates noise, which are significant drawbacks in motor vehicle applications.

In addition, the air supply to the gas generation system is very complicated in such systems, since it requires a suitable regulation of the second compressor, as well as metering of the oxygen containing gas by means of complicated nozzles, such as Laval nozzles or similar devices.

Accordingly, there remains a need for apparatus for supplying an oxygen-containing gas to a fuel cell system, particularly apparatus embodying a simple, lightweight, and self regulating design. The present invention fulfils these needs and provides further related advantages.

BRIEF SUMMARY OF THE INVENTION

In one embodiment of an apparatus for supply an oxygen containing gas to a fuel cell system, a compression device directly supplies an oxygen containing gas to both the gas generation system and to the cathode side of the fuel cell. Exhaust gases from the anode side and the cathode side of the fuel cell are combined down-stream of the fuel cell, possibly downstream of other intermediate components. In the area of this junction point the exhaust gases are at substantially the same pressure level. This may permit the metering of a set or desired dosage of oxygen-containing gas into the component(s), independent of the press individual components.

In further embodiments, the design of the fuel cell system is such that the sum of the pressure drops in the components carrying oxygen- containing gas upstream of the exhaust gas junction on the cathode side is larger than the sum of the pressure drops in the components carrying oxygen containing gas in the gas generation system upstream of the exhaust gas junction on the anode side.

In still another embodiment, the apparatus further comprises at least one main branch line for supplying an oxygen containing gas to the gas generation system, wherein the main branch line contains at least one fan. The fan may increase the pressure of the oxygen containing gas that is metered into the one or more components of the gas generation system by a small amount, for example by 50 to 300 mbar.

These and other aspects will be evident upon reference to the attached Figures and following detailed description.

BRIEF DESCRIPTION OF THE DRAWING(S)

DETAILED DESCRIPTION OF THE INVENTION

Figure 1:
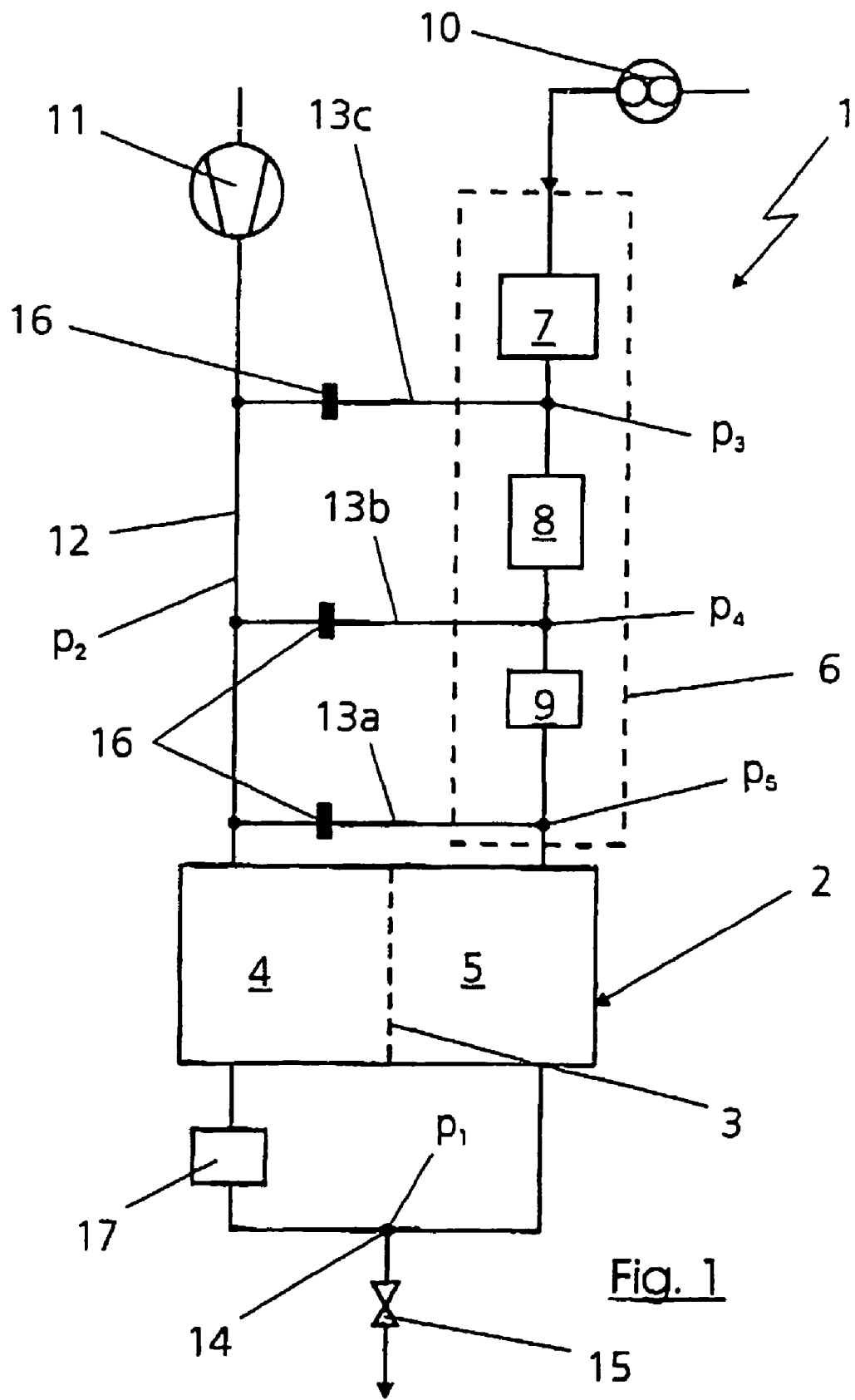
FIG. 1 is a schematic representation of one embodiment of an apparatus for supplying an oxygen-containing gas to a fuel cell system.

FIG. 1 shows a fuel cell system 1 with a fuel cell 2, which in this example is a PEM fuel cell, in which a polymeric ion exchange membrane 3 separates a cathode chamber 4 from an anode chamber 5. In addition, the schematically shown fuel cell system 1 comprises a gas generation system 6. In the illustrated embodiment, gas generation system 6 is a conventional system comprising several individual components. These individual components can, for example, include an evaporator 7, a reformer 8, and a selective oxidizer 9. The reformer 8 may be, for example, an autothermal reformer or a partial oxidation reformer 8.

Gas generation system 6 is supplied with a process stream for the production of the hydrogen-containing gas, for example a mixture of an alcohol and water, by means of a schematically shown feed device 10. Other features of the gas generation system, such as the energy supply, which are well known to persons skilled in the art, are not shown but understood to be present.

The cathode chamber 4 of the fuel cell 2 is supplied with an oxygen-containing gas, which in the case of the above mentioned PEM fuel cell can be air, by means of a compression device 11 and an air supply line 12 between the compression device 11 and the cathode chamber 4 of fuel cell 2.

In addition, exhaust gases discharged from anode chamber 5 and cathode chamber 4 are combined downstream of fuel cell 2. In FIG. 1, pressure-maintaining valve 15 is installed downstream of junction point 14, and is used to maintain the system pressure in the fuel cell system 1 at a desired pressure level. Downstream of valve 15, the exhaust gas can be discharged into the surroundings. Alternatively, the exhaust gas may be subjected to purification or supplied to a catalytic burner or similar device before being discharged. In any event, the treatment of the exhaust gas is not important in the present invention, and the exhaust gases may be dealt with in any manner suitable for a given application.

In FIG. 1, three supply lines 13*a*, 13*b*, 13*c* branch off the air supply line 12 to supply air from cathode supply line 12 to the anode side of the fuel cell system 1, in particular to the gas generation system 6 upstream of the anode. Supply line 13*a* is an "air bleed" line for introducing small amounts of oxygen into the hydrogen-containing gas before it enters into the anode chamber 5 of the fuel cell 2. The use of an "air bleed" in PEM fuel cell systems is known in the art (see U.S. Pat. No. 4,910,099) and not essential to the present apparatus, so it will not be discussed in any detail. The second supply line 13*b* supplies the necessary oxygen to the selective oxidizer 9 of gas generation system 6 for oxidizing carbon monoxide, contained in the hydrogen-containing gas stream downstream of the reformer 8, to carbon dioxide. Of course, the selective oxidizer 9 can contain several stages, in which case oxygen can be dosed into individual or all stages by means of additional supply lines. Supply line 13*c* supplies air to the reformer 8.

A suitable pressure difference may be established so that the air compressed by compression device 11 can flow into gas generation system 6. This may be accomplished by combining exhaust gases from fuel cell 2 downstream of the fuel cell. The two exhaust gas streams at junction 14 will be at a first pressure, $p_1$. If desired, pressure $p_1$ may be adjusted to the desired system pressure of the fuel cell system 1 by means of pressure maintaining valve 15, although valve 15 is not essential to the operation of fuel cell system 1 or the present apparatus.

In the embodiment of FIG. 1, the sum of the pressure drops in the components through which the oxygen containing gas passes on the anode side is smaller than the sum of the pressure drops in the components that are supplied with oxygen-containing gas on the cathode side. Thus, the pressure drop produced by the cathode chamber 4 is higher than the combined pressure drops that are produced by the anode chamber 5, the selective oxidizer 9, and the reformer 8. In order to obtain a substantially identical pressure $p_1$ on the anode side and on the cathode side at junction 14, pressure $p_2$ in air supply line 12 must be larger than the pressures $p_3$, $p_4$, $p_5$ in gas generation system 6.

Furthermore, by suitably dimensioning the flow cross sections of the air supply line(s), it is possible to obtain a configuration of the fuel cell system 1 wherein the air supply is an automatically self-regulating system, which only requires a minimum number of components and does not need any control elements, because the control is passive.

If desired, the individual air streams flowing into gas generation system 6 may be controlled by throttle elements 16, which may for example comprise annular diaphragms. The ratio of the individual air streams required for the respective components 8, 9 of gas generation system 6 and/or for the air bleed are at least approximately constant throughout the entire load range of the fuel cell system 1. In order to be able to adjust for possible small deviations in the ratio throughout the load range, the annular diaphragms may be designed as turbulent or laminar throttle elements 16, which provide different characteristics. This makes it possible to easily adjust for air dosing requirements that have been determined during system development. Potential deviations which may occur under other load conditions, which can not be completely compensated for by adapting the characteristics of the throttle elements 16 to that of a laminar or turbulent throttle, may be acceptable.

Another component that is shown in the exhaust gas branch is a throttle device 17. This throttle device 17, which may be capable of being engaged and disengaged and can provide at least two flow cross sections, is used for cold-start of fuel cell system 1. During cold-start, the throttle device 17 is engaged to increase the pressure drop on the cathode side. As a result of this, the system can deliver more oxygen to the gas generation system 6 than during regular operation, when the throttle device 17 offers a larger flow cross-section. This makes it possible to increase the dosage of oxygen to the gas generation system 6. This increased dosing of oxygen, in particular to the reformer 8, allows a significantly faster heating of the gas generation system 6. Consequently this simple measure can shorten the cold-start time of fuel cell system 1.

Figure 2:
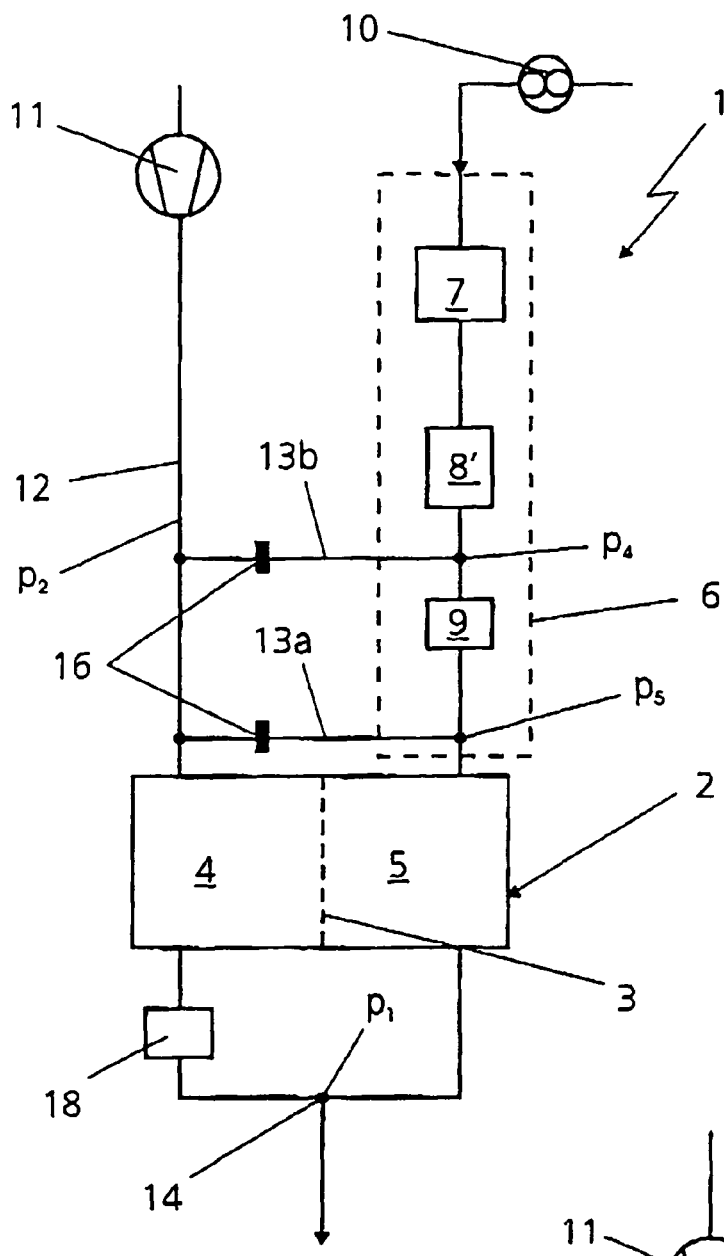
FIG. 2 is a schematic representation of another embodiment of an apparatus for supplying an oxygen-containing gas to a fuel cell system.

FIG. 2 is a schematic representation of another embodiment of the present apparatus, which has essentially the same mode of operation. Identical components are labelled by the same reference numerals as in FIG. 1.

In the embodiment of FIG. 2, reformer 8 is a steam reformer 8' with endothermic operation, which—as is generally known—does not require any oxygen to carry out the reforming reaction. Accordingly, this eliminates the need for supply line 13*c*. The system includes the two other supply lines 13*a* for the air bleed and 13*b* for the supply to the selective oxidizer 9. The air bleed, typically improves the functioning of the fuel cell 2, but is not generally absolutely necessary for the functioning of the fuel cell. Accordingly, in a very simple configuration the number of supply lines 13 to the gas generation system can be reduced to a single one, which supplies the selective oxidizer 9.

FIG. 2 includes component 18 in the exhaust gas stream between cathode chamber 4 and junction 14. This component 18 can for example be a heat exchanger, which reclaims the thermal energy in the exhaust gas for further use in the fuel cell system 1 or in other systems, for example for the heating of the passenger compartment, or similar purposes. In addition, component 18 can produce a pressure drop, which may make it easier to obtain a higher pressure drop on the cathode side than on the anode side.

Figure 3:
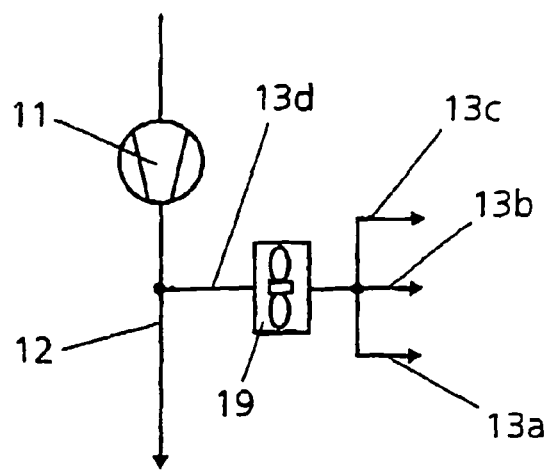
FIG. 3 is a schematic representation of a further embodiment of an apparatus for supplying an oxygen-containing gas to a fuel cell system.

If, for mechanical fuel cell system design reasons, it should not be possible or be very difficult to design the pressure drops of the individual components 4, 5, 8, 9, and possibly 18 in a way so that the dosing of the oxygen containing medium into the gas generation system 6 takes place in an automatic and self-regulating manner, it is possible to employ an additional fan 19. In FIG. 3, for example, fan 19 is installed in a main branch line 13*d* in the area between the cathode air supply line 12 and the gas generation supply lines 13*a*, 13*b*, 13*c*. During operation, fan 19 can increase the pressure by approximately 50 to 300 mbar, so that possible differences between the pressure drops on the anode side and cathode side can be compensated for. Note that fan 19 does not require a control system, but a simple fan operating at a constant speed and creating a constant pressure increase is sufficient. In this manner, it becomes possible to compensate for minor deviations of the pressure drops of the individual components using simple and lightweight fans that operate at a constant speed and are very quiet. Of course it can also be envisioned to provide only some of the supply lines 13a, 13b, 13c with their own fans 19, since there can be different pressure drops—depending on the number of components that have to be passed before the junction 14—which may have to be compensated for or not.

The present apparatus provides for a completely self regulating system, which only requires the one compressor (or a comparable gas supply device) that is already required to supply oxygen-containing gas to the cathode side of a fuel cell. Due to the higher pressure drop on the cathode side, the dosing of oxygen-containing gas into one or more gas generation system components takes place completely automatically, eliminating the need for a control or regulating system. Thus, the present apparatus reduces the complexity and number of components as compared to current fuel cell systems.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus for supplying an oxygen-containing gas to a fuel cell system, the fuel cell system comprising at least one fuel cell and at least one gas generation system having at least one component requiring oxygen during operation, and a compression device to supply oxygen-containing gas to a cathode chamber of the fuel cell, the apparatus comprising:
   a first supply line connected to the compression device and the cathode chamber;
   at least one branch line connected to the first supply line for supplying oxygen-containing gas to the at least one component of the gas generation system; and
   a junction point downstream of the fuel cell at which cathode exhaust from the cathode chamber and anode exhaust from an anode chamber of the fuel cell are combined;
   wherein, the system further includes components which maintain pressure in the system such that the sum of the pressure drops in components in the first supply line upstream of the junction point is greater than the sum of the pressure drops across components in the gas generation system and the anode chamber upstream of the junction point.

2. The apparatus of claim 1, further comprising a heat exchanger between the cathode chamber and the junction point.

3. The apparatus of claim 1, wherein the at least one branch line comprises at least one fan.

4. The apparatus of claim 3, wherein the at least one branch line is divided into a plurality of branch lines at a point downstream of the fan.

5. The apparatus according to claim 1, wherein said components that maintain pressure in the system include a throttle device situated in an exhaust line from the cathode chamber, upstream of the junction point.

6. The apparatus of claim 5, wherein said components that maintain pressure in the system further include a throttle element disposed within the at least one branch line.

7. The apparatus according to claim 6, wherein said throttle element has a variable cross section that can be reduced during starting, to deliver more air to the gas generation system during starting than during steady state operation.

8. The apparatus according to claim 1, wherein:
   said components that maintain pressure in said system comprise said first air supply line; and
   said first air supply line has a cross sectional area such that said pressure drops are maintained without further regulation, and such that the air supply is self regulating.

9. An apparatus for supplying an oxygen-containing gas to a fuel cell system, the fuel cell system comprising at least one fuel cell and at least one gas generation system having at least one component requiring oxygen during operation, and a compression device to supply oxygen-containing gas to a cathode chamber of the fuel cell, the apparatus comprising:
   a first supply line connected to the compression device and the cathode chamber;
   at least one branch line connected to the first supply line for supplying oxygen-containing gas to the at least one component of the gas generation system; and
   a junction point downstream of the fuel cell at which cathode exhaust from the cathode chamber and anode exhaust from an anode chamber of the fuel cell are combined;
   wherein the at least one branch line comprises a first branch line for supplying oxygen-containing gas to a reformer, a second branch line for supplying oxygen-containing gas to a selective oxidizer, and a third branch line for supplying oxygen-containing gas to the anode chamber of the fuel cell.

10. The apparatus of claim 9, further comprising an anode-side throttle element disposed in at least two of the three branch lines.

11. The apparatus of claim 10, wherein at least one of the branch lines contains a fan.

12. The apparatus of claim 10, wherein the anode-side throttle elements are fixed annular diaphragms.

13. The apparatus of claim 12, further comprising a cathode side throttle device between the cathode chamber and the junction point.

14. The apparatus of claim 13, wherein the cathode-side throttle device comprises at least one discrete flow cross-section.

15. An apparatus for supplying an oxygen-containing gas to a fuel cell system, the fuel cell system comprising at least one fuel cell and at least one gas generation system having at least one component requiring oxygen during operation, and a compression device to supply oxygen-containing gas to a cathode chamber of the fuel cell, the apparatus comprising:
   a first supply line connected to the compression device and the cathode chamber;
   at least one branch line connected to the first supply line for supplying oxygen-containing gas to the at least one component of the gas generation system; and
   a junction point downstream of the fuel cell at which cathode exhaust from the cathode chamber and anode exhaust from an anode chamber of the fuel cell are combined;
   wherein the apparatus further comprises a pressure-maintaining valve located downstream of the junction point.

16. A fuel cell system comprising:
   at least one fuel cell having a cathode chamber and an anode chamber;
   a gas generation system for producing a hydrogen-containing gas from a process stream containing carbon and hydrogen and supplying the hydrogen-containing gas to the anode chamber of the fuel cell, the gas generating system having at least one component requiring oxygen during operation;
   a compression device for supplying an oxygen containing gas to the cathode chamber of the fuel cell;

a first supply line connected to the compression device and the cathode chamber;

at least one branch line connected to the first supply line for supplying the oxygen-containing gas to the at least one component of the gas generation system; and a junction point downstream of the fuel cell for combining a cathode exhaust from the cathode chamber and an anode exhaust from an anode chamber of the fuel cell;

wherein, the system further includes components which maintain pressure in the system such that the sum of the pressure drops in components in the first supply line upstream of the junction point is greater than the sum of the pressure drops across components in the gas generation system and the anode chamber upstream of the junction point.

* * * * *